(12) United States Patent
Liu et al.

(10) Patent No.: US 7,532,324 B2
(45) Date of Patent: May 12, 2009

(54) EQUIPMENT AND METHOD FOR LED'S TOTAL LUMINOUS FLUX MEASUREMENT WITH A NARROW BEAM STANDARD LIGHT SOURCE

(75) Inventors: Muqing Liu, Shanghai (CN); Xiaoli Zhou, Shanghai (CN); Wenyi Li, Shanghai (CN); Wanlu Zhang, Shanghai (CN); Chuan Yuan, Shanghai (CN)

(73) Assignee: Fu Dan University, Shanghai (CN)

( * ) Notice: Subject to any disclaimer, the term of this patent is extended or adjusted under 35 U.S.C. 154(b) by 35 days.

(21) Appl. No.: 11/877,316

(22) Filed: Oct. 23, 2007

(65) Prior Publication Data

US 2008/0129996 A1 Jun. 5, 2008

(30) Foreign Application Priority Data

Nov. 30, 2006 (CN) .......................... 2006 1 0118915

(51) Int. Cl.
*G01J 3/28* (2006.01)
(52) U.S. Cl. .................. 356/326; 356/236; 250/228
(58) Field of Classification Search ................ 356/326, 356/328, 236; 250/228
See application file for complete search history.

(56) References Cited

U.S. PATENT DOCUMENTS

| 6,597,195 B1* | 7/2003 | Beaudry et al. ............. 324/767 |
| 7,030,642 B2* | 4/2006 | Butsch et al. ............... 324/767 |
| 7,245,074 B2* | 7/2007 | Shiang ........................ 313/504 |

* cited by examiner

*Primary Examiner*—F. L Evans
(74) *Attorney, Agent, or Firm*—Ladas & Parry LLP

(57) ABSTRACT

This invention belongs to the luminous flux measurement field, and especially relates to the equipment and method for LED's total luminous flux measurement with a narrow beam standard light source. The system for LED's total luminous flux measurement with a narrow beam standard light source in this invention comprises an integrating sphere, the light source, a narrow aperture fiber, a spectrometer and a driver for the light source. The light source is lighted by the driver. The narrow beam standard light source (both luminous flux standard and spectrum standard) is placed on the interior surface of integrating sphere, there is not any baffle in the sphere, and a narrow aperture fiber transfers the light to a multi-channel spectrometer which measures the spectrum distribution of LED and calculates its total luminous flux. The equipment in this invention is easy to use, has small error and low cost, and can achieve accurate results for LED's total luminous flux.

7 Claims, 2 Drawing Sheets

EQUIPMENT AND METHOD FOR LED'S TOTAL LUMINOUS FLUX MEASUREMENT WITH A NARROW BEAM STANDARD LIGHT SOURCE

BACKGROUND OF THE INVENTION

1. Field of the Invention

This invention belongs to the luminous flux measurement field, and especially relates to the equipment and method for LED's total luminous flux measurement with a narrow beam standard light source.

2. Description of the Related Art

After having caused the Micro-electronics Revolution, the Semiconductor Technology is causing another industry revolution—the Illumination Revolution. The development, production and application of Light Emitting Diodes (LEDs) has increased tremendously in the last ten years. From their humble beginnings as panel indicator lights, they are now available in many shapes, sizes, light output levels and colors, making them suitable candidates for use in traffic signaling systems, automobile lights and in general lighting applications. The development of the new high power LEDs with a significant increase in efficiency over the earlier versions has resulted in an advantage of close to an order of magnitude of the LED over color filtered incandescent lamps. In china's 11th Five-Year Plan, the development of high-luminous-efficiency LED has been preferentially supported. Supports are given not only to the research for increasing LED's luminous efficiency, but also to LED's parameters measurement technologies such as LED's luminous efficiency measurement.

In fact, difficulties for luminous efficiency measurement of light sources lie in the total luminous flux measurement. Since the geometry structure of LED is different from traditional light sources, there is not yet an international standard method for LED's luminous flux measurement, although the International committee on Illumination (CIE) and research institutions of America and Canada have suggested some measurement method for LED's total luminous flux.

Some Challenging Problems in Total Flux Measurement for LED:

1) The Mismatch Between Sensitivity of Detector $R(\lambda)$ and Spectral Luminous Efficiency Function $V(\lambda)$.

We use incandescent lamp for calibrating photometer currently and evaluate the mismatch error (refer as SCF) in average value over the whole visible range, this evaluation defines the average error in percentage for whole visible range while the percentage error in blue wavelength is possibly quite bigger than SCF since the absolute value of $V(\lambda)$ is very small in the blue wavelength range, similar situation occurs in red wavelength range. Photometer with good SCF calibrated in the methods is good for measuring light sources with continuous spectrum. However, LED is available in wide variety of peak wavelengths covering the visible and adjacent wavelength range, and LED's narrow bandwidth is typically 20 nm to 40 nm. Therefore, it will cause a significant error in total flux measurement for blue/red LED by a photometer even with a good SCF correction.

2) Great Absorption of Objects Inside the Sphere:

For an ideal sphere calculation, it is assumed that there are no objects in the sphere. However, when we use a sphere, we need to put objects (the light sources, baffles and the holders for the light sources) into it, these objects will inevitably cause disturbance of light distribution within the sphere and error in measuring of LED's total luminous flux.

3) Self-Heating Problems

LED is sensitive to the environment temperatures, so the temperature of LED must stay stable during the measurement. When we place the LED inside the integrating sphere, it can't dissipate its heat easily, which will cause the drop of output luminous flux, and bring measurement errors.

Because of these problems, there are always disagreements in LED's luminous flux measurement, which affects LED's performance judgment, and is not benefit for the development of the LED's industry.

SUMMARY OF THE INVENTION

The purpose of this invention is to design an equipment and corresponding accurate method for LED's total luminous flux measurement with a narrow beam standard light source.

In this invention a narrow beam standard light source (both luminous flux standard and spectrum standard) is placed on the surface of the integrating sphere. The narrow beam standard light source is specially designed for the total flux measurement of LED, it is suitable to be placed on the interior wall of the integrating sphere, and its special structure reduces the sphere wall's absorption of luminous flux to the least. There is not any baffle in the sphere, so the self-absorption by objects inside the sphere does not exist.

The light from the light sources is transferred by a narrow aperture fiber to a multi-channel spectrometer to measure the spectrum distribution and calculate the total luminous flux, thus accurate measurement results for LED's total luminous flux can be realized. The aperture of fiber filters the direct light from light source to the entrance of the fiber. This method can satisfy the theory of integrating sphere. The multi-channel spectrometer can correct the mismatch of $V(\lambda)$ by software, so the detector's spectral response can be the same as human eyes.

This invention provides an equipment for LED's total luminous flux measurement with a narrow beam standard light source, which consists of an integrating sphere, a narrow beam standard light source, a narrow aperture fiber, a spectrometer and a driver for the light source. The light source is placed on the interior surface of the integrating sphere, the narrow aperture fiber is assembled on a window of the integrating sphere to transfer the light to the multi-channel spectrometer, the driver for the light source is connected to the light source to drive it, there is only the light source in the integrating sphere, the interior wall of the integrating sphere is coated with a white diffuse-reflection layer, its reflectivity is uniform all over the complete inner wall, and its reflectance conforms Lambert's law.

In this invention, a narrow beam standard light source for calibration is used; other conditions are same as the conventional calibration operating method.

In this invention, a narrow aperture fiber is used to transfer the light to the multi-channel spectrometer to complete the measurement.

In this invention, the diameter of the integrating sphere is decided by the power of the light source, the fiber and the spectrometer can be selected according to the specific measurement requirements and conditions.

On the other hand, this invention provides a method for LED's total luminous flux measurement with a narrow beam standard light source, which includes calibration of the standard light source, measurement of LED sample light source and processing of measurement results, the standard light source is a standard for both spectrum and luminous flux, the spectrum distribution of the standard light source is used as the standard value of the measurement; the LED to be measured is placed on the interior surface of the same integrating sphere instead of the standard light source, then its relative spectrum distribution is measured; last, the luminous flux of the LED for measuring is calculated by comparing the spectrum distribution of the LED for measuring with that of the standard light source.

In this invention, the interior wall of the integrating sphere is coated with a white diffuse-reflection layer, its reflectivity is uniform all over the complete interior wall and its reflectance conforms Lambert's law.

In this invention, the narrow beam standard light source is used for calibrating, the LED for measuring and the standard light source are placed on the surface of the integrating sphere, and there is not any baffle in the sphere.

In this invention, the narrow aperture fiber is used to transfer the light to the multi-channel spectrometer to complete the measurement.

In this invention, the goniophotometer with an angular resolution of no bigger than 0.2 degree and a detector's V(λ) matching error of less than 3% is used for luminous flux calibration.

In this invention, the narrow beam standard light source is placed on the surface of the integrating sphere, and a conventional color temperature standard lamp is placed inside the sphere when calibrating the spectrum.

In this invention, the spectrometer is a multi-channel-spectrometer with a wavelength range of 200 nm-1100 nm Specifically, measurement method of this invention are as follows:

1. Calibration of Narrow Beam Standard Light Source
Because this standard light source is the calibration light source for both spectrum and luminous flux, so this light source must be calibrated for its spectrum and total luminous flux.
Luminous flux calibration: a small goniophotometry is used to measure the luminous flux of the narrow beam standard light source. The Goniophotometry's angular resolution is no bigger than 0.2 degree, detector's V(λ) matching error is less than 3%, and it have a good stability. This method is suitable for transfer the luminous flux.
Spectrum calibration: a small integrating sphere is used, the narrow beam standard light source is placed on the surface of the sphere, and a conventional color temperature (spectrum distribution) standard lamp with similar color temperature is placed inside the sphere for transferring the spectrum distribution, as shown in FIG. 3.
First, placing the narrow beam standard light source on the surface of the integrating sphere and turning it on, then completing the measurement with the spectrometer, inputting the value of standard light source's luminous flux and color temperature, recording standard light source's spectrum, and saving standard light source's spectrum distribution as the standard value of the measurement.

2. Measurement of LED Sample
Assembling the components as FIG. 1, the LED for measuring is placed on the surface of the same sphere, measuring the relative spectrum distribution with the spectrometer, and then calculating the LED's total luminous flux by comparing with the standard light source.

3. Calculation Formula or Calculation Method
The integrating sphere is a complete sphere shell with a white diffuse reflection layer on its interior wall. The light source can be placed at any point inside the sphere, as shown in FIG. 4. Diffuse reflectivity is uniform over the interior wall of the sphere, and the reflection obeys the Lambert's Law. The reflectivity is ρ, interior radius of the sphere is r, the center of the sphere is at point o, and the total luminous flux of the light source is Φ. Luminous flux refers to the radiation energy that can be perceived by the human eye, it equals to the radiation energy of a certain wavelength range and the relative visual ratio of this wavelength range per unit of time. Because the relative visual ratio of the human eye is different at different wavelength, the luminous flux is different when lights of different waves have the same radiation power. For example, when a green light with a wavelength of 555 nm and a red light with wavelength of 650 nm have the same radiation power, the luminous flux of the former is 10 times as big as that of the latter. The unit of luminous flux is "lumen" (lm). Luminous flux is usually marked as Φ. For an absolute black body at platinum's freezing point, the luminous flux radiated from an area of $5.305*10^3$ cm$^2$ is 1 lm. Illuminance established by the light source S is different at different points inside the sphere, the illuminance of any point M on the sphere wall is a sum of several times of illuminances.

As shown in FIG. 4, we suppose that the illuminance established by S at point A inside the sphere is Ea, and considering A as a second luminous body. Because of first diffuse reflection light, the second illuminance established by area element da near A at the area near point M is dE2:

$$dE_2 = \frac{\rho E_\alpha \cdot dS}{4\pi r^2}$$

The second illuminance established by the whole sphere shell at point M is:

$$E_2 = \int_s dE_2 = \frac{\rho}{4\pi r^2} \int_s E_\alpha dS = \frac{\rho \cdot \Phi}{4\pi \cdot r^2}$$

The third illuminance established by the second diffuse reflection light at point M is: $E_3 = \rho \cdot E_2$
Therefore, illuminance E at any point M inside the sphere is: $E = E_1 + E_2 + E_3 + \ldots$
So illuminance of point M:

$$E = E_1 + \frac{\Phi}{4\pi r^2} \cdot \frac{\rho}{1-\rho}$$

Illuminance at points of the sphere's interior wall with a baffle:

$$dE_2 = \frac{\rho \cdot E_\alpha \cdot dS}{4\pi \cdot r^2}$$

For a certain sphere, r and ρ are constant, illuminance at any point on the sphere wall (after blocking the first illuminance) is proportional to the total luminous flux of light source S, so we can calculate luminous flux of light source by measuring the illuminance on a small window in the integrating sphere wall.

The most convenient way to measure luminous flux is comparison. Turning on the standard light source and the light source to be measured inside the sphere respectively, the illuminance established at the sphere window are Es and Ex respectively, and the currents of detector are Is and Ix respectively, so $$\Phi_X = \frac{E_X}{E_S}\Phi_S$$

If the detector works in the linear range, Is and Ix are proportional to Es and Ex respectively, so $$\Phi_X = \frac{I_X}{I_S}\Phi_S$$

The signal on the detector has nothing to do with the location of the light source. In conventional integrating sphere measurement, the light source is usually placed at the center of the integrating sphere. As a new light source, LED itself has some special characteristics:

1. The total luminous flux of LED decreases quickly as its temperature increases. So the cooling system must be good, as LED's luminous flux output should be stable when measuring. However, the closed space of the integrating space can not meet that cooling requirements.
2. LED is small in size, the self-absorption effect caused by the baffle and light source's holder can not be ignored. If we place the light source in the center of the sphere as the traditional measuring method, the above features of LED will inevitably bring errors to the measurement results.

In this invention, both the standard light source and the LED are placed on the surface of the integrating sphere, so that we can avoid the luminous flux drop caused by the temperature rise during measurement. Holder of LED is placed outside the sphere, and there are not any baffle inside the sphere, which in the greatest extent meets requirements of the integrating sphere theory and reduces the self-absorption influence to the least. We use a narrow aperture fiber, so that no direct light from light source can enter the fiber. Therefore, the baffle is not needed any more, which make it satisfy the integrating sphere theory.

In this invention, the measurement equipment of total luminous flux measurement of LED with a narrow beam standard light source comprises an integrating sphere, the standard light source, the light source's driver, a narrow aperture fiber, and a CCD based multi-channel-spectrometer. This invention uses a narrow beam standard light source for both luminous flux standard and spectrum standard, and the light source is placed on the surface of the integrating sphere. There is not any baffle in the sphere, and a narrow aperture fiber transfers the light to a multi-channel spectrometer which measures the spectrum distribution of LED and then calculates its total luminous flux. This method can achieve accurate measurement results of total luminous flux.

Features of this invention are as follows:
A. A narrow beam standard light source is used;
B. The standard light source is placed on the surface of the integrating sphere, and there is not any baffle in the sphere;
C. A narrow aperture fiber transfers the light to the multi-channel spectrometer.
D. The multi-channel spectrometer measures spectrum distribution, and then calibrates the V(λ) curve by software.

The equipment of this invention is easy to use, it has small error and low cost, and can complete accurate measurement for LED's total luminous flux.

In these figures, 1 is the integrating sphere, 2 is the light source, 3 is the fiber, 4 is the multi-channel spectrometer, 5 is the light source's driver, 6 is the baffle, 7 is the conventional standard light source, 8 is the narrow beam standard light source.

DETAILED DESCRIPTION OF THE PREFERRED EMBODIMENTS

Components used in this invention:
LED: the LED for measuring with different color and flux;
Standard light source: halogen lamp which is a narrow beam standard light source by optical design;
Conventional standard lamp: common incandescent lamp of known luminous flux;
Integrating sphere: integrating sphere without baffle;
Fiber: narrow aperture fiber;
Spectrometer: CCD based multi-channel spectrometer;
Light source's driver: light source's driver with constant current;

EXAMPLE 1

Using the Measurement Equipment of LED's Total Luminous Flux with a Narrow Beam Standard Light Source The measurement equipment of LED's total luminous flux with a narrow beam standard in this invention consists of the integrating sphere without baffle, the light source's driver, the narrow aperture fiber and the CCD based multi-channel spectrometer.

1. Standard Lamp

Figure 2:
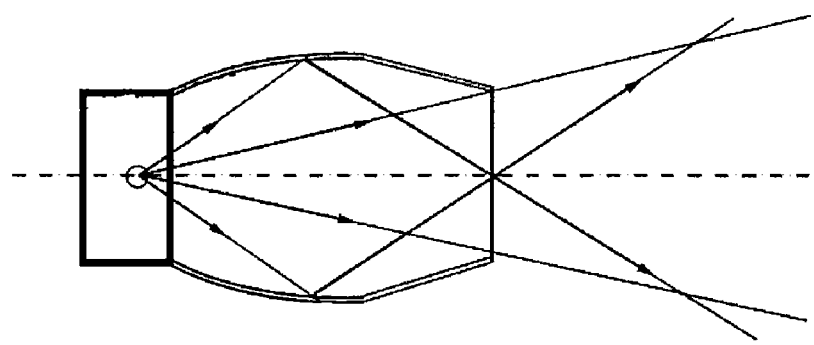
FIG. 2 is the narrow beam standard light source specially designed to be placed on the interior wall of the sphere in this invention.

We use narrow beam standard light source is not to simulate LED, but to make all the lights emitted from the standard light source enter into the integrating sphere. The light exit aperture of this narrow beam must match the entrance of the integrating sphere. At the same time, this standard lamp must obtain good stability, have a wide spectrum, and it must be easy to be calibrated. We use a halogen lamp with a color temperature of about 2800K, which emits narrow beam by optical design as shown in FIG. 2.

2. CCD Based Multi-channel Spectrometer

In conventional measurement of photometry parameters (luminous flux, luminous intensity, illumination, luminance, etc), we usually use photo elements with correcting filters to match the V(λ) curve. However, this match is only approximate, and its relative error is bigger when the value of V(λ) is small. For measurement of continuous spectrum light source's parameters such as luminous flux, the final luminous flux measurement error caused by the matching error is comparatively small. But for LED, particularly homochromatic LED, it can lead to great error. Therefore, it is more reasonable to use a multi-channel spectrometer to measure the spectrum distribution of LED and then calculate its total luminous flux. Equipment (instrument) for LED's luminous flux measurement is usually small, so it can be a feasible way to use the multi-channel spectrometer in this invention. This multi-channel spectrometer is a high-performance, small-size, portable spectrometer with a short wavelength range (200 nm~1100 nm). CCD (Charge Coupled Device) is used as the detector. Its main performance parameters are as follows:

| | |
|---|---|
| Energy Consumption | 110 mA, 9 VDC |
| Wavelength Range | 200 nm~1100 nm |
| Detector | 256 pixels CCD, 14 μm × 56 μm per pixel |
| Integration Time | 3 ms~2 s |
| Stray Light | <0.05% |
| A/D Switcher | 16 bit |
| Interface | RS-232 |

Figure 1:
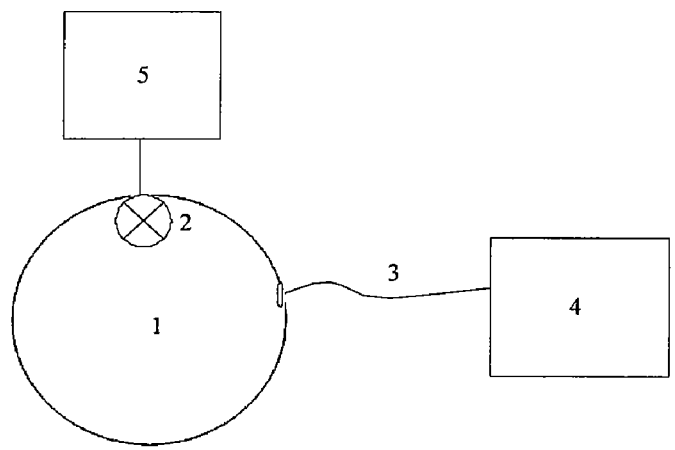
FIG. 1 shows the structure of total luminous flux measurement system for LED with a narrow beam standard light source.

Assembling Process of the Equipment:

Assemble the components as FIG. 1, the LED to be measured or the standard lamp is placed on the surface of the sphere, there is no baffle in the sphere, the narrow aperture fiber transfers the light to the multi-channel spectrometer, which measures the spectrum distribution, and then calculates the total luminous flux, and thus carries out accurate measurement.

EXAMPLE 2

Measurement Example

The measurement method contains steps such as calibration of the standard light source, measurement of LED sample lamp and processing of measurement results.

1. Calibration of the Narrow Beam Standard Light Source

Because this standard light source is the standard lamp for both spectrum and luminous flux, this light source's calibration for spectrum and total luminous flux must be taken into account.

Luminous flux calibration: use small goniophotometry in the measurement, its angular resolution is no bigger than 0.2 degree, detector's V(λ) matching error is less than 3%, and it must have a good stability. This method is suitable for transfer the luminous flux.

Figure 3:
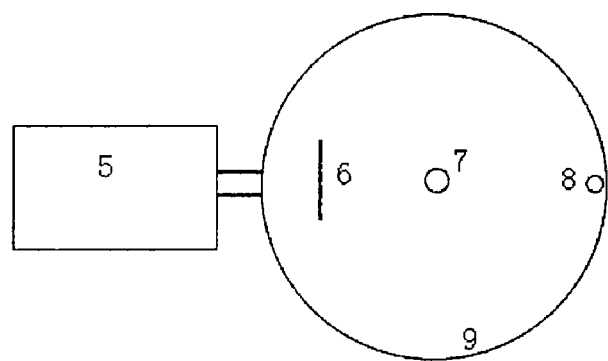
FIG. 3 shows the spectrum distribution calibration for the narrow beam standard light source.
Figure 4:
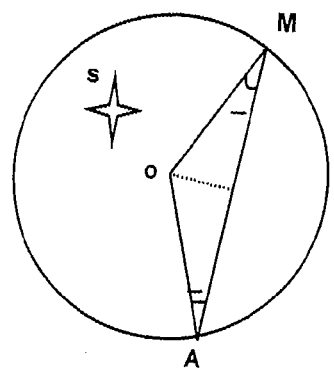
FIG. 4 shows the assumed integrating sphere for the calculation formulas.

Spectrum calibration: use small integrating sphere, on the surface of the sphere open a hole for placing the narrow beam standard light source, and place a conventional color temperature (spectral distribution) standard lamp of close color temperature for transfer the spectrum distribution inside the sphere, as shown in FIG. 3.

2. Measurement of the LED

The measurement equipment is shown in FIG. 1. At first, place the narrow beam standard light source on the surface of the integrating sphere and turn it on, then complete the measurement with the spectrometer, input the value of standard lamp's luminous flux and color temperature, record standard light source's spectrum, and save standard light source's spectral power distribution as the standard value of the measurement; then place the LED to be measured on the surface of the same integrating sphere and turn it on, use the spectrometer to calculate the relative spectrum distribution of the LED for measuring, and then by comparing with the standard lamp, calculate the value of luminous flux of the LED.

3. Calculation Results

Calculate the luminous flux of the LED to be measured using the following formula:

$$\Phi_X = \frac{I_X}{I_S}\Phi_S$$

Figure 5:
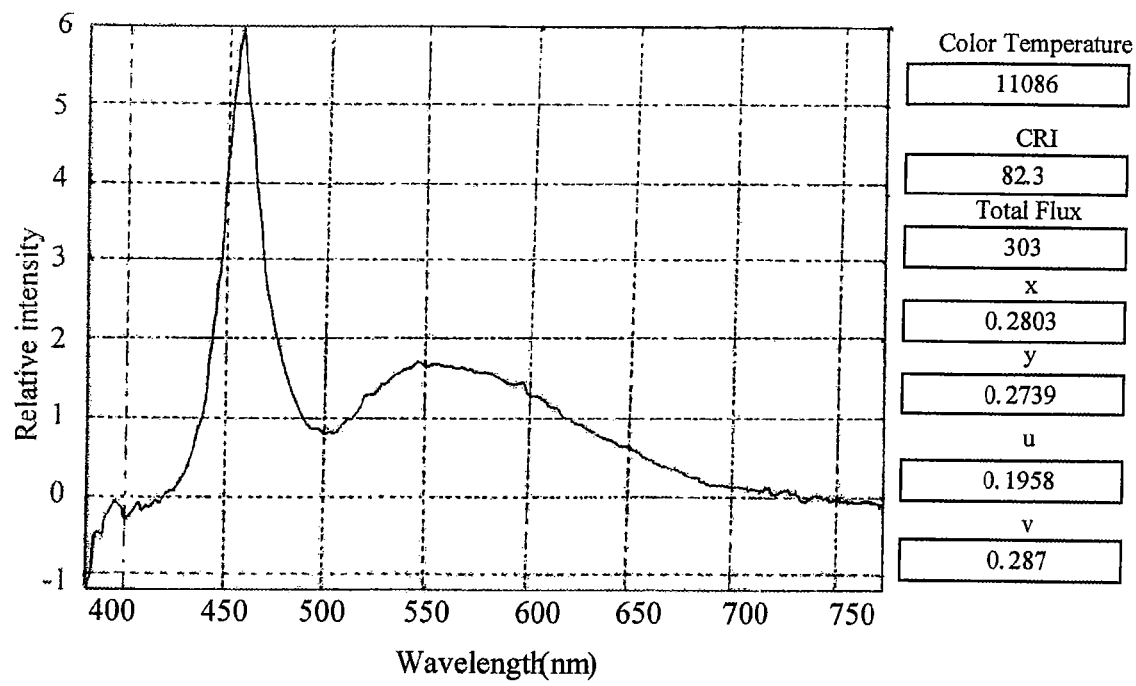
FIG. 5 is the measurement result of this invention.

Take a white light LED of 20 mA for example. The measurement results are:

Luminous flux 3.03 lm, as shown in FIG. 5.

EXAMPLE 3

Comparison of Measurement Results

Use American labspere's LED-1100 goniophotometry to measure the luminous distribution curve of same LED, and from calculation we know that luminous flux of LED is 3.05 lm, while the result is 2.78 lm using the traditional equipment.

| Standard value measured by Lab spere equipment | Measurement result of this invention | Measurement result of traditional equipment |
|---|---|---|
| 3.05 lm | 3.03 lm | 2.78 lm |

Thus it can be seen that the measurement error of this invention is 0.6%, while the measurement error of traditional method is 8.85% because of the light source and baffle's self-absorption.

The invention claimed is:

1. An equipment for LED's total luminous flux measurement with a narrow beam standard light source, comprising: an integrating sphere, the light source, a narrow aperture fiber, a multi-channel spectrometer and a driver for the light source, wherein, the light source is placed on the interior surface of the integrating sphere, the narrow aperture fiber is assembled on a window of the integrating sphere and is connected to the multi-channel spectrometer, the driver is connected to the light source to drive it, the inner wall of the integrating sphere is coated with a white diffuse-reflection layer, and the reflectivity is uniform over the whole inner sphere wall.

2. The equipment according to claim 1, wherein, the narrow aperture fiber transfers the light from the integrating sphere to the spectrometer to complete the measurement.

3. The equipment according to claim 1, wherein the spectrometer is a multi-channel spectrometer with a wavelength range of 200 nm-1100 nm.

4. A method for LED's luminous flux measurement using the equipment of claim 1, comprising: calibration of the standard light source, measurement of LED sample and processing of measurement results, wherein, the standard light source is used as the calibration light source for both spectrum and luminous flux, the standard light source is placed on the interior surface of the integrating sphere, its spectrum distribution measured by the spectrometer is used as the standard value for measurement; then the LED to be measured is placed on the interior surface of the same integrating sphere instead of the standard light source to measure its relative spectrum distribution by the spectrometer; last, the luminous flux of the LED to be measured is calculated by comparing the spectrum distribution of the LED be measured with that of the standard light source.

5. The measurement method according to claim 4, wherein, a narrow beam standard light source is used for calibrating and there is not any baffle in the integrating sphere.

6. The measurement method according to claim 4, wherein, a goniophotometry, whose angular resolution is no bigger than 0.2 degree and detector's $V(\lambda)$ matching error is less than 3% is used for calibrating luminous flux.

7. The measurement method according to claim 4, wherein, the narrow beam standard light source is placed on the interior wall of the integrating sphere, and a conventional color temperature standard lamp is placed inside the integrating sphere to calibrate the spectrum of the standard light source.

* * * * *